United States Patent [19]

Nemoto et al.

[11] 4,363,544

[45] Dec. 14, 1982

[54] REMOTE RELEASABLE CAMERA

[75] Inventors: Takayuki Nemoto, Tachikawa; Hiroyuki Takimoto, Urawa, both of Japan

[73] Assignee: Canon Kabushiki Kaisha, Tokyo, Japan

[21] Appl. No.: 124,752

[22] Filed: Feb. 26, 1980

[30] Foreign Application Priority Data

Feb. 28, 1979 [JP] Japan .................................. 54-22905

[51] Int. Cl.³ ............................ G03B 7/08; G03B 9/64
[52] U.S. Cl. .................................. 354/60 R; 354/238; 354/267
[58] Field of Search ...................... 354/60 R, 131, 238, 354/266, 267, 34, 60 A, 60 E, 60 F, 60 L; 352/141, 179

[56] References Cited

U.S. PATENT DOCUMENTS 3,961,342 6/1976 Maida ........................... 354/60 R X
4,161,355 7/1979 Sahara et al. .................. 354/60 R X Primary Examiner—G. Z. Rubinson
Assistant Examiner—W. J. Brady Attorney, Agent, or Firm—Toren, McGeady & Stanger

[57] ABSTRACT

The disclosed camera is capable of being operated either with a normal shutter release or a remote cable release. An exposure control circuit includes a photoelectric element for automatically controlling the exposure on the basis of the brightness of the object being photographed. A motor control circuit operates a photographic mechanism. A first switch operates in response of the first step of depression of a release button and a second switch responds to further depression of the release button. A third switch is connected to the remote release in parallel with the second switch for actuating the automatic exposure control circuit and the motor control circuit. A delay circuit starts in response to operation of either the first or third switches and produces a signal at a predetermind time after operation of either of the switches. Inhibiting means respond to the signal from the delay circuit to inhibit operation of the motor control circuit until the delay circuit produces its signal so that the automatic exposure control circuit can complete its operation whether it is actuated by the shutter release button on the camera or remotely.

6 Claims, 2 Drawing Figures

REMOTE RELEASABLE CAMERA

BACKGROUND OF THE INVENTION

1. Field of the Invention

The present invention relates to an improvement of the release device of camera, particularly being remote controllable.

2. Description of the Prior Art

It is necessary for a motion picture camera or a motor driven still camera to operate the automatic exposure control circuit before the camera release in order to make a control for obtaining a proper exposure amount.

In case of the conventional motion picture camera the automatic exposure control is carried out with the first stroke of the shutter release button and then after the photographer has confirmed from the numerical display or the like in the view finder that the exposure amount is proper, the motor for operating the shutter and driving the film feeding mechanism is actuated with the second stroke.

When the release button of this kind of camera is operated quickly, there takes place a problem that before the completion of the operation of the automatic exposure control device the photographing is storted in such a manner that the first part of the film is improperly exposed.

On the other hand, in case the camera is remote controlled it is difficult for the photographer to confirm the completion of the exposure control operation, while the construction becomes complicated if the above mentioned automatic exposure control circuit and the driving motor circuit are connected to the separate switches.

Under such circumstances, a remote control device so designed that the camera is provided with a two-step release button and further provided with a wireless control device including a receiver at the time of remote control in such a manner that the control device is operated by means of the signal from the sender, whereby the automatic exposure control device and the film feeding—shutter operating motor are actuated in sequence by means of a delay circuit has been disclosed for example in Japanese Utility Model Publication Gazette No. Sho 53-19056.

However, the above mentioned remote control device is remarkably complicated in construction, while the problem for the quick operation of the release button at the time of the manual photographing is not solved.

SUMMARY OF THE INVENTION

A principal object of the present invention is to offer a release device for a camera being remarkably simple in construction and capable of being remote controlled.

Another object of the present invention is to offer a release device so designed that in case of the remote release the automatic exposure control device and the driving motor are automatically actuated in sequence, while at the time of the manual holding photographing by means of the two-step release button it is possible to start the driving motor after confirming the completion of the automatic exposure control operation in order to prohibit the photographing start till the completion of the exposure control operation even when the release button is operated quickly.

In accordance with the present invention, the first switch to be closed with the first stroke of the shutter release button serves to connect the power source to the circuit for carrying out the automatic exposure control, while the second switch to be closed with the second stroke of the release button serves to actuate the motor control circuit for driving the shutter opening-closing, film feeding mechanism and so on. Parallel with the second switch the remote switch is connected, in such a manner that by closing the switch, the power source is connected to the circuit for driving the automatic exposure control circuit and the motor control circuit.

Further other objects and features will become obvious from the explanation to be made below in accordance with the accompanying drawings.

DESCRIPTION OF PREFERRED EMBODIMENT

Figure 1:
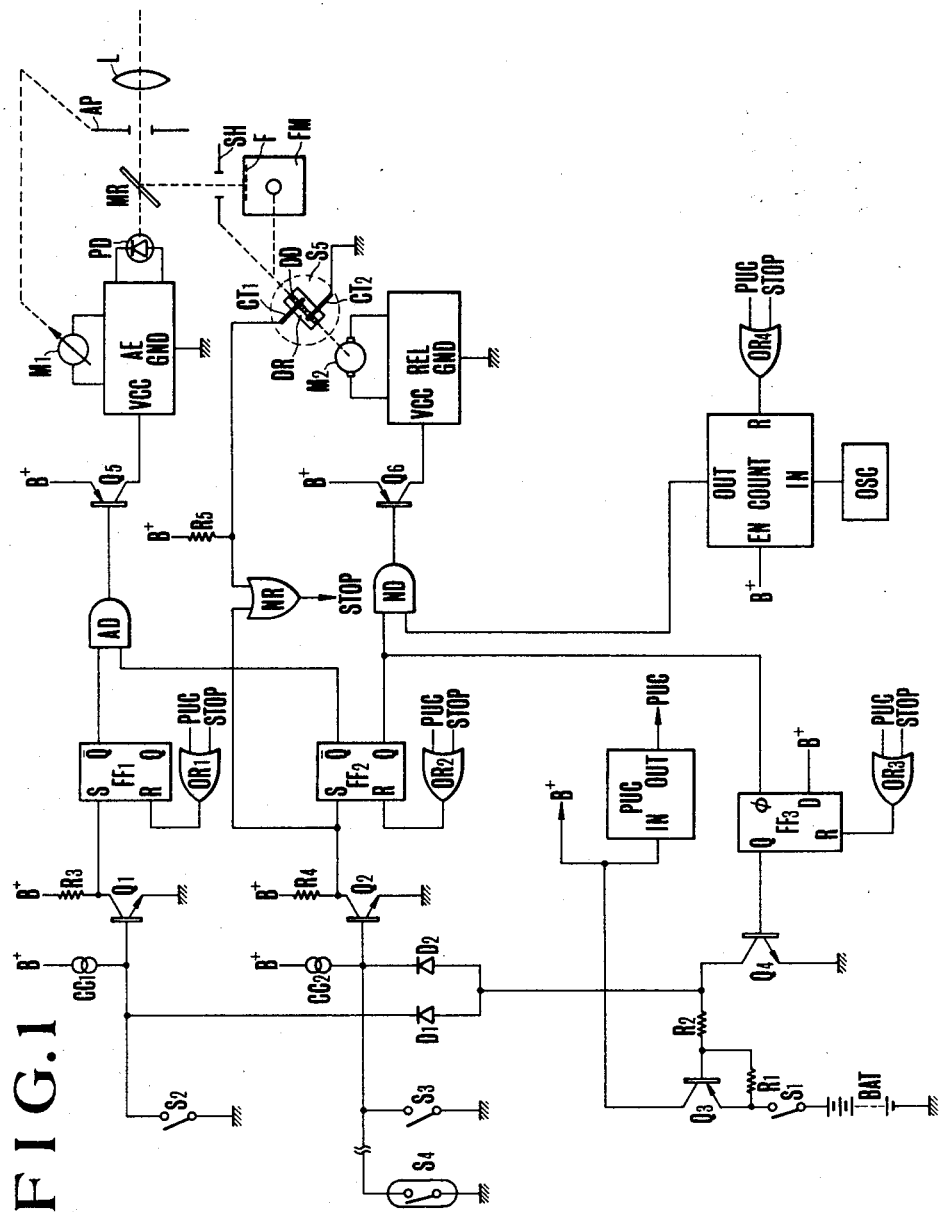
FIG. 1 shows the circuit of an embodiment of the present invention applied to a motion picture camera.

In FIG. 1, AE is the automatic exposure amount control circuit to which the photoelectric element PD and the servo-motor are connected. When the object light beam having passed through the photographing lens L and the diaphragm device AP is incident upon the photoelectric element through the half permeable mirror MR, an electrical output is produced in accordance with the light amount and amplified by means of the circuit AE so as to actuate the motor M1 in order to control the diaphragm device mechanically connected to the motor M1 in such a manner that the amount of the light incident upon the photoelectrical element PD is always constant.

REL is the motor control circuit to which the motor M2 for driving the shutter SH and the film feeding mechanism FM. S5 is the shutter phase detecting switch designed in such a manner that the conductive part PD being parallel to the rotation shaft and having a certain determined width is imbedded in the surface of the conductive body DR secured around the shutter shaft not shown concretely in the drawing in such a manner that when the shutter is closed the contacts CT1 and CT2 becomes conductive through the conductive body DD so as to deliver a low level signal to the one of the NOR gates to be explained later.

BAT is the power source battery, S1 is the power source switch, S2 is the first switch to be closed with the first stroke of the shutter release button not shown in the drawing so as to actuate the automatic exposure amount control circuit AE, S3 is the second switch to be closed with the second stroke of the release button so as to actuate the motor control circuit REL, Q3 is the power source switching transistor, PUC is the single pulse generator for resetting the Flip-Flop of the current supply control circuit and the counter and OSC is the standard clock pulse generator connected to the input terminal of the counter COUNT.

Below the operation of the circuit shown in FIG. 1 will be explained.

When the power source switch S1 is closed, the voltage of the battery BAT is applied to the base of the transistor Q3 through its emitter and the resistance, so that as long as the base current is zero the transistor Q3 remains in the opened state.

When then the switch S2 is closed with the first stroke of the release button the base of the transistor Q3 is grounded through the resistance R2, the diode D1 and the switch S2 in such a manner that the transistor Q3 is brought in the closed state. Thus, the power source current flows from the emitter of the transistor Q3 to the collector so as to apply a positive potential B+ to the current supply control circuit.

At the time of the rise of the positive potential B+ the above mentioned single pulse generator PUC produces a positive pulse having a pulse width (T1) of several miliseconds. This pulse is delivered to each reset input terminal R of the Flip-Flops FF1-FF3 through the OR gates OR1-OR4 so as to reset the respective circuits. Further, the above mentioned clock pulse generator OSC is also actuated at the time of the rise of the positive potential B+, so that the produced pulses are delivered to the input terminal IN of the counter COUNT.

With the rise of the positive potential B+ the counter COUNT becomes conductive with the input terminal EN so as to be in a position to carry out the counting and start the counting operation with the falling down of the set pulse delivered to the input terminal R.

On the other hand along with the closing of the first switch S2 and base potential of the transistor Q1 becomes low, whereby the transistor Q1 is brought into the opened state, while the collector potential becomes high and applied to the input terminal S of the R-S Flip-Flop FF1. The level of the one output $\bar{Q}$ of the Flip-Flop FF1 is reversed from high to low by means of the input of the reset pulse PUC. Consequently, the output of the AND gate AD becomes low, the transistor Q5 assumes the conductive state, the positive potential B+ is applied to the automatic exposure amount control circuit AE and the electrical output in accordance with the light amount incident upon the photoelectrical element PD is amplified so as to rotate the motor M1 in order to start the automatic exposure control.

When with the further shutter release operation the second switch S3 is closed the transistor Q2 is turned off so that the collector potential of the transistor becomes high and is applied to the set input terminal S of the R-S Flip-Flop FF2 so that the level at the one output terminal Q is reversed from low to high and the output is on the one hand connected to the clock input terminal Φ of the D Flip-Flop FF3 so as to maintain the level of the output Q of the Flip-Flop high. By means of the output the transistor Q4 is brought in the closed state so as to branch the base current of the transistor Q3. This is to maintain the current supply to the internal circuits through the transistor Q3 until the necessary sequence for stopping the camera to be explained later is completed when the switch S3 is opened.

The output terminal Q of the above mentioned Flip-Flop FF2 is further connected to the one input of the NAND gate ND whose other input is connected to the output terminal OUT of the above mentioned counter COUNT, whereby when the counter has counted a predetermined number of pulses so that the output becomes high the output of the NAND gate becomes low. Thus, the transistor Q6 connected to the output of the ND assumes the conductive state so as to supply current from the power source to the above mentioned motor control circuit REL. Thus, the motor M2 starts to rotate so as to actuate the shutter operating mechanism, the film feeding mechanism and so on in order to take a photograph.

The above mentioned counter is so designed that the output becomes high in level when it has counted a predetermined number of pulses corresponding to a time sufficient for the automatic exposure control, so that even when the shutter button is operated rapidly the start of the motor control circuit is delayed by a predetermined time so as to start the photographic operation after the automatic exposure control has been finished.

When the release button is pushed down to the first step so as to maintain only the first switch S2 in the closed state, the motor control circuit cannot be operated even after the output of the counter becomes high because the Q output of the Flip-Flop FF2 is low. Consequently, it is possible for the photographer to start photographing by further pushing the release button after having confirmed the aperture value by means of the display means in the view finder not shown in the drawing. Further, depending upon the circumstances it is possible to stop photographing by letting go of the release button above or to change the shutter opening angle.

So far the normal release operation for ordinary photographing has been explained.

Below the remote release operation will be explained.

In FIG. 1, S4 is the third switch for operating the above mentioned automatic exposure control circuit and the above mentioned motor control circuit by means of the remote control, being connected in parallel with the above mentioned second switch S3 through the connecting terminals provided at the side of the camera and the extension cord.

When the remote switch S4 is closed in the state in which the power source switch S1 is closed, the base current of the transistor Q3 is grounded through the resistance R'2 and the diode D2 so as to bring the transistor Q3 in the closed state and supply the positive potential B+ to the internal circuit in the same way as in case of the ordinary photography.

At the same time the collector potential of the transistor Q2 becomes high and the one output $\bar{Q}$ of the R-S Flip-Flop FF2 connected hereto becomes low in level, while the other input Q is reversed and made high so that the output of the AND gate AD connected to the output $\bar{Q}$ immediately becomes low in level so as to actuate the automatic exposure control circuit AE in the same way as in the above mentioned case. On the other hand, the output of the NAND gate ND connected to the other output Q becomes low in level only after receipt of the signal from the output OUT of the counter COUNT which output become high, being delayed for a certain determined time in the same way as in the above mentioned case so as to actuate the motor control circuit REL in order to carry out photographing.

Then, the photographing is stopped by letting the release button switch S3 or the remote switch S4 alone.

In this case, even if the above switch is let alone, the photographing operation is not stopped immediately but only after the shutter has been closed completely. Namely, even after the above switch is opened the current supply switching transistor Q3 is held in the closed state by means of the power source maintaining transistor Q4 in such a manner that all the circuits continue operating, when the shutter SH is closed, a low level signal is supplied to the one input of the NOR gate NR when the above mentioned shutter phase detecting switch S5 is closed. The other input of the NOR gate NR is connected to the transistor Q2, whereby the above mentioned transistor Q2 is in the closed state by means of the constant current source CC2, while the collector is in the low level. Consequently, the output of the above mentioned NOR gate is high in level and delivered to the reset input terminals of the Flip-Flops FF1–FF3 and the counter COUNT as stop signal through the OR gates OR1–OR4 so as to reset all the circuit, whereby also the positive potential B+ lowers down to stop.

Figure 2:
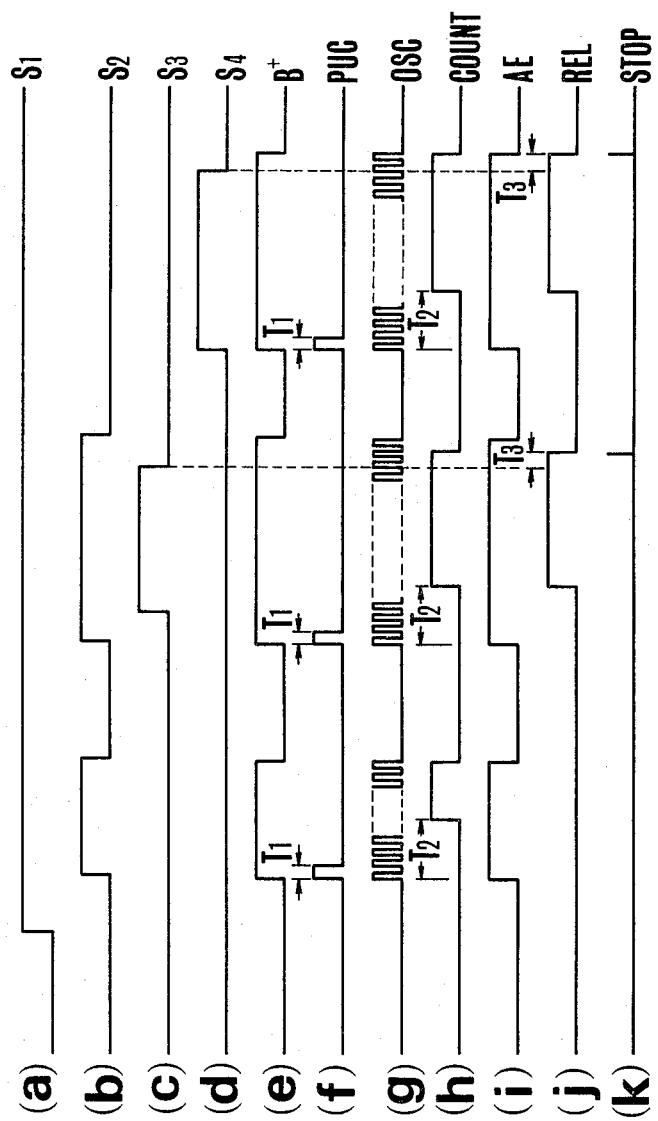
FIG. 2 shows the timing chart of the above circuit.

FIG. 2 shows a timing chart for explaining a series of sequence from the start till the stop of the exposure control in connection with the switch operation of the above mentioned switch.

In the drawing, (a) shows the state of the power source switch S1, whereby the high level in the chart shows the closed state, (b) shows the closed and the opened state of the first switch S2 corresponding to the first stroke of the release button. (c) shows the closed and the opened state of the second switch S3 corresponding to the second stroke of the release button. (d) shows the closed and the opened state of the remote release switch S4, whereby the high level shows the closed state of the switch S4. (e) shows applied state of the positive potential B+ to the internal circuit. (f) shows the single pulse for resetting, whereby T1 is the pulse width. (g) shows the state of the clock pulse oscillator OSC starting to self oscillate at the same time with the application of the positive potential B+. (h) shows the wave form of the output of the counter COUNT carrying out the counting operation with the clock pulses. (i) shows the operation of the automatic exposure amount control circuit AE. (j) shows the operation of the shutter and the motor control circuit REL for film feeding. (k) shows the timing for producing the stop signal for stopping the photographing operation. T3 is the power source maintaining time since the production of the STOP signal after the opening of the second switch S3 till the stop of the motor control circuit REL.

What is claimed is:

1. A locally or remotely operable exposure control camera comprising:
 a release button depressable to a first and then to a second position;
 an automatic exposure control circuit having a photoelectric element so as to automatically control the amount of exposure in accordance with the brightness of an object to be photographed;
 a photographic mechanism, a motor for driving the photographic mechanism and a motor control circuit for controlling the motor for driving the photographic mechanism;
 a first switch in the camera to be closed when the release button reaches its first position to operate the automatic exposure control circuit;
 a second switch in the camera to be closed when the release button reaches its second position in order to actuate the motor control circuit;
 contact means contactable to an independently operable third switch outside of the camera and connected in parallel only with the second switch for actuating the automatic exposure control circuit and the motor control circuit in response to operation of the third switch;
 delay means arranged to be coupled to one of the first and third switches for providing a control signal for controlling the motor control circuit at a certain time after operation of any one of the first, second and third switches, said delay means being independent of closing of the second switch after the first switch is closed following depression of the release button; and
 inhibiting means coupled between the second switch and the motor control circuit for inhibiting the motor control circuit to render the motor inoperative until the control signal is provided by the delay means even when the switch is closed.

2. A locally or remotely operable automatic exposure control camera comprising:
 a release button depressable to a first and then to a second position;
 an automatic exposure control circuit including a photoelectric element;
 a photographic mechanism, a motor for driving the photographic mechanism and a motor control circuit for controlling the motor for driving the photographic mechanism;
 a power source for said circuits;
 power source switching means for connecting the power source to said circuits;
 a first switch in the camera to be closed when the release button reaches its first position to close the power source switching means and actuate the automatic exposure control circuit;
 a second switch in the camera to be closed when the release button reaches its second position in order to actuate the motor control circuit;
 a pair of connecting terminals for connection to an independently operating third switch outside of the camera and connected in parallel with the second switch to close the power source switching means and to actuate the automatic exposure control circuit and the motor control circuit;
 delay means arranged to be coupled to one of the first and third switches for providing a control signal for controlling the motor control circuit at a certain time after operation of any one of the first, and third switches, said delay means being independent of closing of the second switch after the first switch is closed following depression of the release button; and
 inhibiting means coupled between the second switch and the motor control circuit for inhibiting the motor control circuit to render the motor inoperative until the control signal is provided by the delay means even when the second switch is closed.

3. A locally or remotely operable automatic exposure control camera comprising:
 a release button depresssable to a first and then to a second position;
 an automatic exposure control circuit including a photoelectric element to automatically control the amount of exposure in accordance with the brightness of an object to be photographed;
 a photographic mechanism, a motor for driving the photographic mechanism and a motor control circuit for controlling the motor for driving the photographic mechanism;
 a power source;
 a first switch in the camera to be closed when the release button reaches its first position to operate the automatic exposure control circuit;
 a second switch in the camera to be closed when the release button reaches its second position in order to actuate the motor control circuit;
 contact means contactable to an independently operable third switch outside of the camera and connected in parallel only with the second switch for actuating the automatic exposure control circuit and the motor control circuit in response to operation of the third switch;

a current supply control circuit for controlling the current to the automatic exposure control circuit and the motor control circuit;

power source switching means to be closed by either the first or the third switch to connect the power source to the current supply control circuit;

delay means arranged to be coupled to one of the first and third switches for providing a control signal for controlling the motor control circuit at a certain time after operation of any one of the first, and third switches, said delay means being independent of closing of the second switch after the first switch is closed following depression of the release button; and inhibiting means coupled between the second switch and the motor control circuit for inhibiting the motor control circuit to render the motor inoperative until the control signal is provided by the delay means even when the second switch is closed.

4. A locally or remotely operable automatic exposure control camera comprising:

a release button depressable to a first and then to a second position;

an automatic exposure control circuit having a photoelectric element so as to automatically control the amount of exposure in accordance with the brightness of an object to be photographed;

a photographic mechanism, a motor for driving the photographic mechanism and a motor control circuit for controlling the motor;

a power source;

a current supply control circuit for controlling the current to the automatic exposure control circuit and the motor control circuit;

a first switch in the camera to be closed when the release button reaches its first position;

a second switch in the camera to be closed when the release button reaches its second position;

connector means connectable to an independently operable third switch outside of the camera and connected in parallel only with the second switch;

power source switching means to be closed with the closing of either the first or the third switch so as to connect the power source to the current supply control circuit and for energizing the automatic exposure control circuit upon closing of the first switch, the motor control circuit upon closing of the second switch and the automatic exposure control circuit as well as the motor control circuit upon independent closing of the third switch;

delay means arranged to be coupled to one of the first and third switches for providing a control signal for controlling the motor control circuit at a certain time after operation of any one of the first, and third switches, said delay means being independent of closing of the second switch after the first switch is closed following depression of the release button; and inhibiting means coupled between the second switch and the motor control circuit for inhibiting the motor control circuit to render the motor inoperative until the control signal is provided by the delay means even when the second switch is closed.

5. A locally or remotely operable automatic exposure camera comprising:

a release button depressable to a first and then to a second position;

an automatic exposure control circuit having a photoelectrical element so as to automatically control the amount of exposure in accordance with the brightness of an object to be photographed; a photographic mechanism, a motor for driving the photographic mechanism and a motor control circuit for controlling the motor;

a power source;

a current supply control circuit for controlling the current to the automatic exposure control circuit and the motor control circuit, the current supply control circuit including:

power source maintaining means for keeping the power source switching means closed even after the opening of the second or the third switch;

shutter phase detecting means for producing a signal when the shutter has been closed; and stop signal producing means for deactivating the power source maintaining means in response to the signal from the detecting means;

a first switch in the camera to be closed when the release button reaches its first position;

a second switch in the camera to be closed when the release button reaches its second position;

connector means connectable to an independently operable third switch outside of the camera and connected in parallel only with the second switch;

power source switching means to be closed with the closing of either the first or the third switch so as to connect the power source to the current supply control circuit and for energizing the automatic exposure control circuit upon closing of the first switch, the motor control circuit upon closing of the second switch, and the automatic exposure control circuit as well as the motor control circuit upon independent closing of the third switch; and a delay circuit for starting operation in response to closing of the first or third switches and for inhibiting operation of said motor control circuit for a predetermined length of time after closing of the first or third switches, so that the automatic exposure control circuit and the delay circuit start operation in response to operation of the first switch, the motor control circuit starts operation in response to the second switch and an output of the delay circuit, the automatic exposure control circuit and the delay circuit start operation in response to operation of the third switch, and the motor control circuit can start operation in response to closing of the second or third switches after elapse of the predetermined length of time.

6. A locally or remotely operable exposure control camera comprising:

a release button depressable to a first and then to a second position;

an automatic exposure control circuit having a photoelectric element so as to automatically control the amount of exposure in accordance with the brightness of an object to be photographed;

a photographic mechanism, a motor for driving the photographic mechanism and a motor control circuit for controlling the motor for driving the photographic mechanism;

a first switch in the camera to be closed when the release button reaches its first position to operate the automatic exposure control circuit;

a second switch in the camera to be closed when the release button reaches its second position in order to actuate the motor control circuit;

contact means contactable to an independently operable third switch outside of the camera and connected in parallel only with the second switch for actuating the automatic exposure control circuit and the motor control circuit in response to operation of the third switch;

delay means for producing a control signal a predetermined time after operation of any one of the first and third switches;

inhibiting means between the second switch and the motor control circuit for inhibiting response to the motor control circuit to the second switch closing before the control signal and permitting response to the second switch thereafter.

* * * * *